J. P. JACOBS.
DEMOUNTABLE RIM HOLDER.
APPLICATION FILED MAY 6, 1919.
1,321,921.
Patented Nov. 18, 1919.
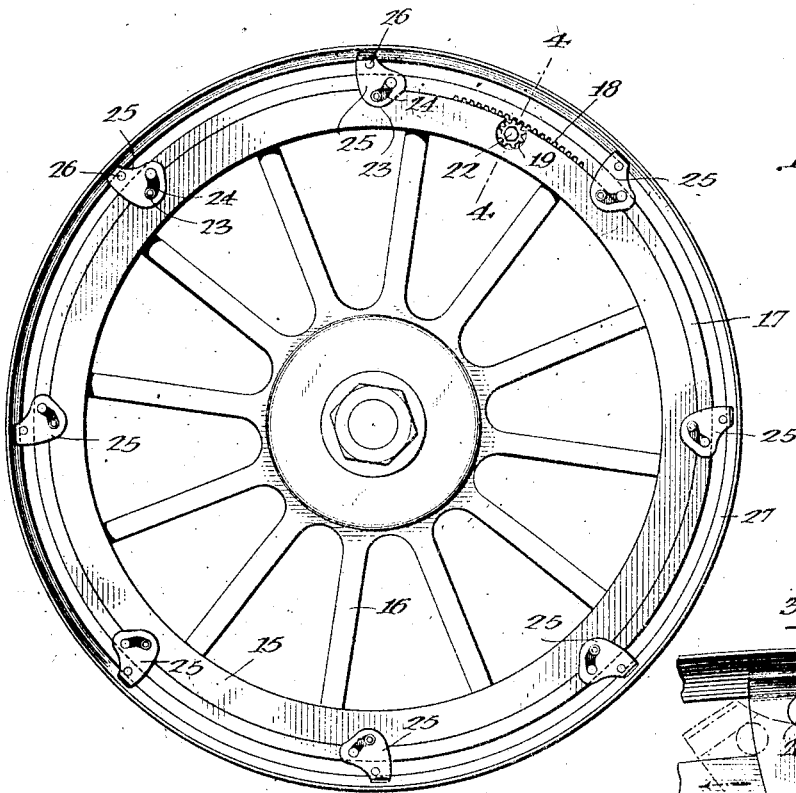
Fig. 1.
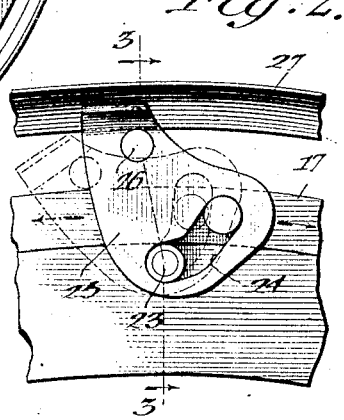
Fig. 2.
Fig. 4.
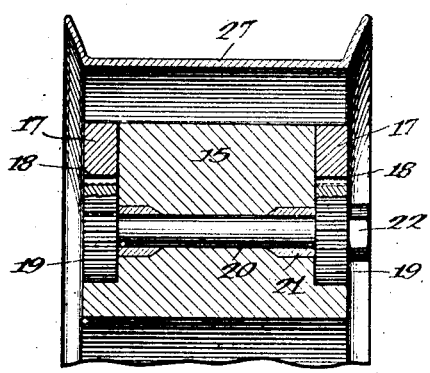
Fig. 3.
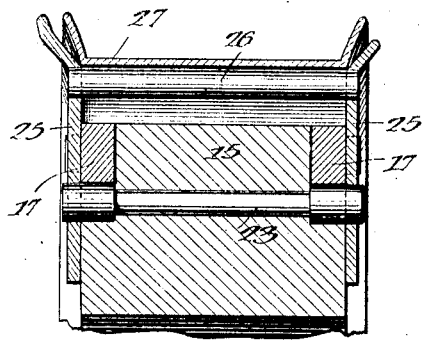
WITNESSES
Francis E. Alden
J. P. Jacobs,
INVENTOR.
BY Munn & Co.
ATTORNEYS

UNITED STATES PATENT OFFICE.

JESSE PRUETT JACOBS, OF SHELBYVILLE, TENNESSEE.

DEMOUNTABLE-RIM HOLDER.

1,321,921.   Specification of Letters Patent.   Patented Nov. 18, 1919.

Application filed May 6, 1919. Serial No. 295,170.

*To all whom it may concern:*

Be it known that I, JESSE PRUETT JACOBS, a citizen of the United States, and a resident of Shelbyville, in the county of Bedford and State of Tennessee, have invented certain new and useful Improvements in Demountable-Rim Holders, of which the following is a specification.

My present invention relates generally to vehicle wheels and more particularly to demountable rims, and has for its primary object the provision of a holding arrangement capable of manipulation from a single point to either lock or release the rim in respect to the wheel felly, instead of the individual manipulation of an annular series of rim holding lugs as now required.

A further object is the provision of an arrangement which will automatically center the rim with respect to the wheel.

In the accompanying drawing illustrating my invention and forming a part of this specification, Figure 1 is a side view;

Fig. 2 is an enlarged fragmentary side view;

Fig. 3 is a transverse section on line 3—3 of Fig. 2; and

Fig. 4 is an enlarged transverse section on line 4—4 of Fig. 1.

Referring now to these figures, I provide the felly 15 of a wheel 16 with side grooves or rabbets at its outer periphery in which are rotatably seated the lug controlling rings 17, each having an inner rack face 18 along a portion thereof engaged by one of a pair of gears 19 mounted upon the opposite ends of a shaft 20 which, as seen particularly in Fig. 4, is journaled transversely through the wheel felly, preferably in bushings 21. One end of this shaft 20 has a polygonal enlargement 22, so that the shaft may be conveniently rotated by means of an ordinary socket wrench (not shown), and the rings 17 simultaneously rotated.

At equi-distantly spaced points around the wheel 16, cross rods 23 are extended laterally through the felly 15 and through the inner ends of arcuate slots 24 of the rim lugs 25 disposed in pairs of which the lugs of each pair are opposite one another at the felly sides and are rigidly connected by a cross bar 26 beyond the outer peripheral face of the felly. The slots 24 of these rim lugs are also entered by studs 27 of the rings 17 and thus when the rings are shifted in one direction the entire series of lugs are moved correspondingly in an outward direction to the full line position of Fig. 2, their cross bars 26 pressing outwardly against the inner face of the tire holding rim 27. The outer ends of the lugs 25 are thus positioned at the opposite sides of the rim 27 to prevent lateral shifting and displacement thereof until the rings 17 are shifted in the opposite direction so as to cant the entire series of lugs inwardly beyond the inner face of the rim as seen in dotted lines in Fig. 2 when the rim is to be removed.

It is obvious, from the foregoing, that after the rim is placed properly on the wheel felly, for which purpose the lugs around one side are of greater length than the other to form rim abutments, the cross bars 26 of the several pairs of rocking lugs, will, in their movement outwardly against the rim, act as cams to wedge the rim in place and effectively center the same with respect to the wheel.

In addition to the foregoing, it is to be understood, however, that the rim may be the usual, or any other means engaging the wheel felly to prevent its circumferential movement with respect thereto.

I claim:

1. The combination of a wheel felly having annular series of opposite side lugs provided with connecting cross bars disposed across the outer peripheral face of the felly, a demountable rim for engagement by said cross bars, and means for simultaneously shifting the series of lugs inwardly an outwardly with respect to the felly.

2. The combination of a wheel felly having annular series of opposite side lugs provided with connecting cross bars disposed across the outer peripheral face of the felly, a demountable rim for engagement by said cross bars, and means for simultaneously shifting the series of lugs inwardly and outwardly with respect to the felly, the lugs at one side of the felly having portions projecting a greater distance beyond the cross bars than the other lugs, for the purpose described.

3. The combination of a wheel felly having annular series of opposite side lugs provided with connecting cross bars disposed across the outer peripheral face of the felly, a demountable rim for engagement by said cross bars, annular rings carried by the felly and engaging the several lugs to shift the same, and means for simultaneously shifting the said rings.

4. The combination of a wheel felly and rim, rocking lugs carried by the felly at its opposite sides and connected across its peripheral face, and means for simultaneously rocking the said lugs into and out of active engagement with the rim.

5. The combination of a wheel felly and rim, rocking lugs carried by the felly at its opposite sides, said lugs being arranged opposite one another in pairs and each having angular slots, a cross bar connecting the lugs of each pair outwardly beyond the felly, and circumferentially shiftable rings carried by the felly and having studs extending into the lug slots for the purpose described.

6. The combination of a wheel felly and rim, rocking lugs carried by the felly at its opposite sides, said lugs being arranged opposite one another in pairs and each having angular slots, a cross bar connecting the lugs of each pair outward beyond the felly, said felly having annular side grooves, circumferentially shiftable rings seated in said grooves and having studs extending into the lug slots, said rings also having rack portions, and a shaft journaled transversely through the felly and having gears thereon engaging the rack portions of the rings.

JESSE PRUETT JACOBS.

Witnesses:
   JOE W. BAILEY,
   J. E. WEGOLD.